United States Patent [19]

Beecher

[11] 4,222,997
[45] Sep. 16, 1980

[54] METHOD OF RECOVERING HYDROCHLORIC ACID FROM SPENT HYDROCHLORIC ACID PICKLE WASTE

[75] Inventor: Brazier K. Beecher, Wyandotte, Mich.

[73] Assignee: Voss Steel Corporation, Taylor, Mich.

[21] Appl. No.: 19,033

[22] Filed: Mar. 9, 1979

[51] Int. Cl.² .................... C01B 7/01; C01G 49/14
[52] U.S. Cl. .................... 423/481; 423/488; 423/558; 423/DIG. 1; 134/12; 134/13; 203/12
[58] Field of Search ......... 423/481, 488, 558, DIG. 1; 134/12, 13; 203/25, 12

[56] References Cited

U.S. PATENT DOCUMENTS

| 1,897,996 | 2/1933 | Barstow | 423/488 |
| 2,437,290 | 3/1948 | Bottenberg | 423/488 |
| 3,131,110 | 4/1964 | Duval | 203/12 |
| 3,635,664 | 1/1972 | Morimoto | 423/488 |

FOREIGN PATENT DOCUMENTS 177444  3/1922  United Kingdom .................... 423/558

Primary Examiner—Brian E. Hearn
Attorney, Agent, or Firm—Cullen, Sloman, Cantor, Grauer, Scott & Rutherford

[57] ABSTRACT

A method of recovering hydrochloric acid from spent hydrochloric acid pickle liquor is used to increase the amount of hydrochloric acid recovered and to improve the form of the waste products for better handling and reduced energy costs. The waste pickle liquor from the pickle line is first concentrated before the liquor is reacted in a double exchange process with strong sulphuric acid. The concentrator separates the weak pickle into two streams consisting of an overhead vapor stream and an underflow of strong pickle liquor. The overhead vapor stream separates out hydrochloric acid by means of a fractionator with the underflow of strong pickle liquor being fed to the double exchanger reactor to be mixed with the sulphuric acid. The overhead from the reaction process which consists of hydrogen chloride and water vapor is condensed and made available for addition to the fractionated hydrogen chloride. The remaining products of the double exchange reaction are filtered to form ferrous sulphate monohydrate crystals.

8 Claims, 1 Drawing Figure

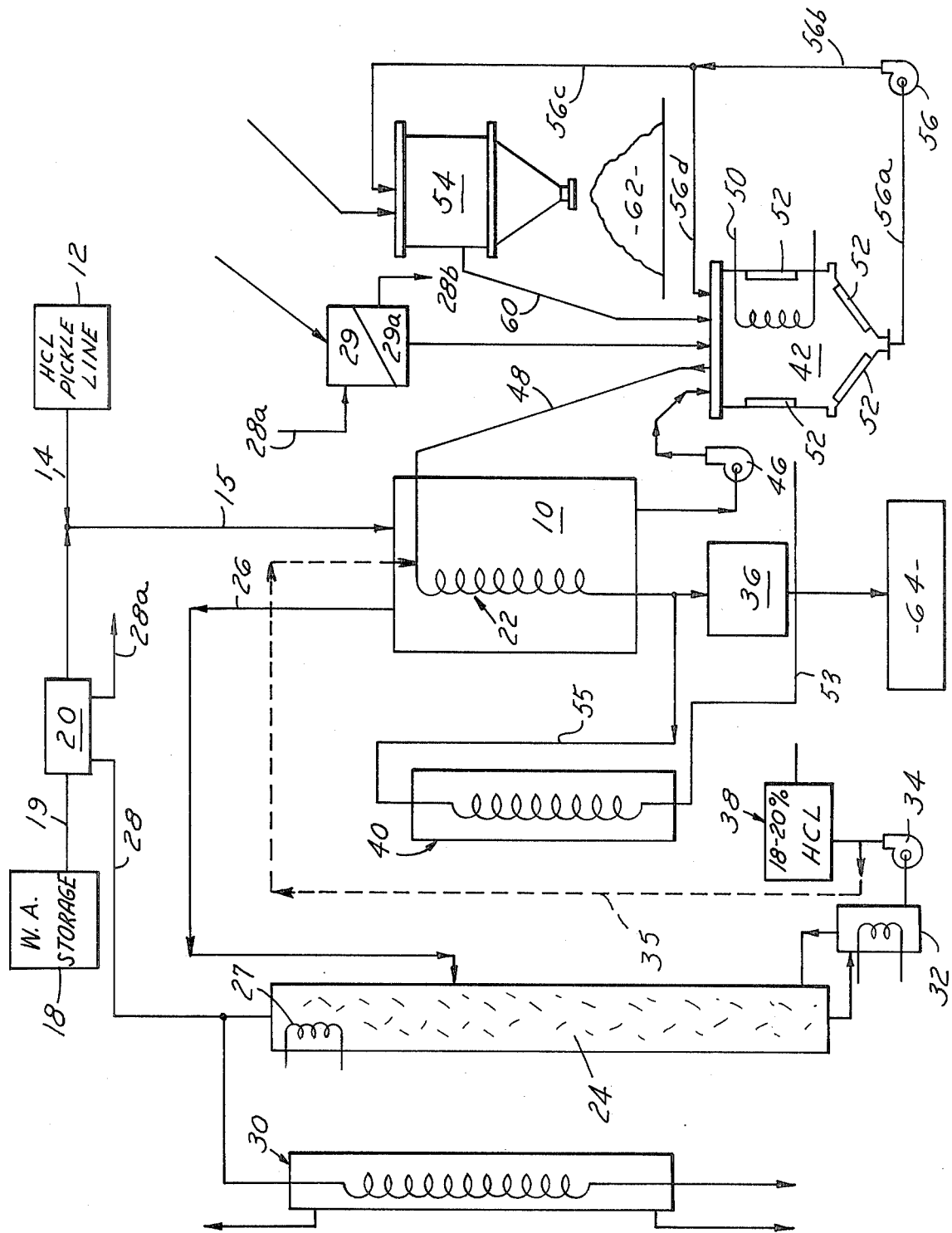

METHOD OF RECOVERING HYDROCHLORIC ACID FROM SPENT HYDROCHLORIC ACID PICKLE WASTE

BACKGROUND OF THE INVENTION

The regeneration of hydrochloric acid pickling waste, which involves the recovery of hydrochloric acid from waste left after a pickling operation on various steel products, has led to three primary areas of concern regarding the operation of the recovery system. First, hydrochloric acid availability has been materially reduced with a corresponding increase in cost throughout the industry. Second, the heat or energy necessary to operate a recovery process is less available and at an increased cost. Third, the environmental disposal of waste hydrochloric acid pickle liquor is becoming a critical factor in all systems designs.

The prior art method for treating hydrochloric acid pickle waste as illustrated in U.S. Pat. No. 3,635,664 to Morimoto issued Jan. 18, 1972 involves an addition of sulphuric acid to the hydrochloric acid pickling waste to convert $FeCl_2$ in the waste to HCl and $FeSO_4$. Then the resulting mixture is distilled to vaporize substantially all of the HCl together with the water and to precipitate the ferrous sulphate. Finally, the HCl and water are condensed to recover hydrochloric acid while separating out the precipitated ferrous sulphate from the residual liquid and circulating the resultant liquid as a sulphuric acid source. The Morimoto patent uses flash distillation to vaporize the hydrochloric acid in the mixture of waste hydrochloric acid and sulphuric acid.

Some of the difficulties inherent in the Morimoto process include a need to concentrate the sulphuric acid in the mother liquor before it can be recirculated back to the reactor which, of course, requires an additional amount of energy to remove the water from the sulphuric acid, especially at the high reactor temperatures. That is, the heat of vaporization of water from sulphuric acid is high compared to that from ferrous chloride solution.

The patents to Morgan No. (1,626,623), Whetzel (2,005,120), Smith (2,118,272), Edge (2,395,729), Swindin (2,616,790), Shaw (2,662,812), Martin (2,668,130), Francis (2,880,062), Sweet et al (2,960,391), Umstead (3,713,786) and Morimoto (3,743,484), are addressed to processes for recovery of metals from pickle waste which does not contain hydrochloric acid. The patent to Senior et al (3,787,306) is addressed to a metal recovery system using oxidation and neutralization which requires substantial energy expenditure. The patents to Minkoff et al (1,798,099), Adamson (1,764,593) and Haen (687,994), show common hydrochloric acid production methods unrelated to pickle waste recovery.

The hydrochloric acid recovery method of the present invention overcomes the difficulties of the prior art in supplying sufficient energy to remove water from the waste solution in order to complete the waste removal process.

SUMMARY OF THE INVENTION

The present invention provides a method for recovering hydrochloric acid from hydrochloric acid pickling waste which contains ferrous chloride. Initially, the pickling waste is concentrated by separating the waste into hydrogen chloride vapor and water vapor and a second section of underflow stream of strong waste pickling liquor. Then the overhead stream is separated into water vapor and hydrochloric acid by using a fractionator. The next step involved in the process is reacting the concentrated underflow stream of strong pickling waste with preheated concentrated sulphuric acid in a double exchange reactor. The hydrogen chloride liberated by the double exchange and the hydrogen chloride and water vapor from the concentrated pickling waste is circulated away from the reactor and condensed. Simultaneously and as a separate process, the ferrous sulphate monohydrate formed in the double exchange reaction is filtered out and stored.

In one embodiment of the process, the condensed hydrogen chloride and the fractionated hydrogen chloride are added together and stored. Furthermore, the overhead from the reactor is used as a source of energy to operate the concentrator and the heat exchanger.

The overhead stream from the fractionator has a trace of hydrogen chloride. The heat in this vapor is used in the pickle line or it is used to preheat the sulphuric acid going to the reactor. This use of internal heat supplied by the process substantially improves the energy efficiency of the method of the present invention in recovering hydrochloric acid from hydrochloric acid pickle waste. Because the sulphuric acid does not have to be concentrated in the mother liquor for reuse in the process, the process of the present invention operates at such a pressure that overhead vapor has accessible usable energy in various forms throughout the recovery system. Additionally, the recovery process of the present invention yields higher concentrations of recovered hydrochloric acid at the end of the process than the method of Morimoto, despite the reduced energy requirements of the system.

Therefore, with the method of the present invention, the hydrochloric acid recovery from a pickling waste system is not only improved, but the entire operation of the system is operated with lower energy requirements and at the same time the amount of waste material to be physically removed after the process is reduced.

BRIEF DESCRIPTION OF THE DRAWING

The hydrochloric acid recovery system of the present invention is detailed in the FIGURE.

DETAILED DESCRIPTION

The hydrochloric acid recovery system of the present invention is shown in the FIGURE wherein a concentrator 10 receives weak waste pickle liquor from a pickle line 12 through lines 14 and 15 or from a weak pickle liquor storage tank 18 through line 19 and preheat heat exchanger 20. The waste acid concentrator 10 receives its energy through a heat exchanger 22 which may be an internal or external heater. Associated with the concentrator 10 is the acid vapor fractionator 24 which is connected to the concentrator by line 26. The fractionator 24 functions to recover the vapors from the concentrator. A reflux condensor 27 controls the fractionated column overhead which is maintained essentially free of hydrogen chloride. The lines 28 contain overhead vapor which is condensed to produce recyclable water. Line 28a from exchanger 20 may contain condensate which eventually produces the final water condensate at 28b after having been processed through the double heat exchanger 29/29a. The heat exchanger 30 represents heat exchangers used to heat water used in the pickle line process such as wash water which is separate from and in addition to the condensate produced at 28b. The bottoms from the fractionator 24 are taken from a reboiler 32 and will yield 18–20% hydrochloric acid. This acid can be pumped at 34 via the dotted line 35 through the heat exchanger 22 to strong acid cooler 36 or directly to the pickle tanks 12 or storage tank 38. The fractionator column can be any standard fractionation column capable of handling the corrosive vapors and liquids which is also designed to handle vapor input. Thus line 35 is to bypass weak hydrochloric acid prior to entering storage 38 and to direct same to the heat exchanger 22 to strengthen the weak hydrochloric acid.

Heat exchanger 40 represents a collection of heat exchangers using any heat over that needed for the waste acid concentrator 10 such as the DuPont Teflon Heat Exchanger for both immersion and external tube heat exchangers of the fluorocarbon resins. The piping used can be of Teflon or Kynar-lined steel pipe. Other high temperature plastic lined piping suitable for the corrosive conditions are available.

Line 53 leaving heat exchanger 40 contains the strong hydrochloric acid formed in the reactor 42 and which was not condensed in the heat exchanger 22. The uncondensed hydrochloric acid and water vapors is directed from heat exchanger 22 via line 55 to the heat exchanger 40.

The main double exchange process takes place in the reactor 42 wherein strong sulphuric acid 95–98% $H_2SO_4$ is pumped to the reactor 42 after preheating in the double heat exchanger 29 and 29a. Simultaneously, the strong waste pickle liquor is pumped at 46 from the concentrator 10 to the reactor 42. The waste acid concentrator 10 receives its heat or energy from the vapors of the reactor 42 through line 48 to heat exchanger 22 already specified. Additionally, the reactor gets some heat and energy from the dilution of the added stoichiometric quantity of 95–98% sulphuric acid which is added to the liquor. The strong waste acid pumped to the reactor is close to the temperature of the reactor as it has come directly from the waste acid concentrator. As an example, the standard double exchange reaction for 1,000 pounds of anhydrous $FeCl_2$ with the stoichiometric sulphuric acid would produce 575.5 pounds of hydrogen chloride.

No additional heat or energy is required above that necessary to vaporize the water and the hydrogen chloride which are present in the strong waste acid liberated by the double decomposition of the ferrous chloride with the sulphuric acid.

The reactor 42 is operated such that at no time is it necessary to concentrate the sulphuric acid in the mother liquor in the reactor system. This is important because considerably more heat is required to remove water from concentrated sulphuric acid especially because of the higher temperature requirements of the reactor. The operation of the reactor 42 is at such a concentration of sulphuric acid which will produce the concentration of water vapor and hydrogen chloride commensurate with the strength of the strong waste acid going to the reactor 42. The sulphuric acid 46 concentration in the mother liquor will vary between 30% and 50%. Additional heat can be supplied to the reactor 42 by internal or external heat exchangers 50 using steam of proper pressure. Another source of energy may be supplied by the electrodes 52 which use the conductivity of the liquor. Such energy may be used to vaporize the water from the strong waste pickle liquor and the hydrogen chloride in the liquor.

The mother liquor in the reactor is recycled through a centrifugal or belt filter 54 to remove the crystallized ferrous sulphate monohydrate. This process also removes some water in the crystallization of the monohydrate. The pump 56 and the associated piping 56a, 56b and 56c are used to recycle the reactor liquor for ferrous sulphate to insure proper mixing and feeding to the filter 54 with the line 60 returning the filtered mother liquor back to the reactor. The stored monohydrate is shown at 62. Piping or line 56d is a bypass for mother liquor from reactor 42 so that a continuous recycle of liquor from reactor 42 is maintained when filter 54 is not in use.

Because of the preconcentration in the concentrator 10 of the original waste acid, no water need be removed from the reactor 42 over that needed to form the strong hydrochloric acid of 30–35%. This keeps the amount of water which must be evaporated from the reactor 42 to a minimum. This is important because the heat of vaporization of water from sulphuric acid is high compared to that from ferrous chloride solution. The operation of three examples given below will further illustrate and explain the features and results of the process. In each of these examples, 1,000 pounds of equivalent anhydrous ferrous chloride is used. That is, the volume of waste pickle liquor is such that 1,000 pounds of ferrous chloride is needed. The use of sulphuric acid is fixed by the stoichiometric quantity of ferrous chloride.

Should extra wash water be necessary in order to meet the specification of the ferrous sulfate, it may be supplied and/or compensated for by increasing the water removal of the waste acid concentrator.

EXAMPLE 1

The waste pickle liquor of the first example has the following compositions: ferrous chloride 28%, hydrogen chloride 4.24%, balance water 67.76%. The feed to the concentrator 10 through line 17 is 3,571.4 pounds of liquor which corresponds to 151.4 pounds of free hydrogen chloride and 2,420 pounds of water. In the concentrator 10, hydrogen chloride and water are boiled off by the action of heat exchanger 22 to leave a concentrated waste pickle liquor. This concentrated waste pickle liquor is pumped at 46 into the sulphuric acid reactor 42. In this example, the weaker acid vapor would have the following composition: HCl 7.7 pounds, $H_2O$ 976.6 pounds. If condensed as such, it would be 0.8% HCl. This is too strong to be discarded and, therefore, it is fed to fractionator 24. In the fractionator, it is divided into two streams; overhead 28 and bottoms or boiler liquor having a weight of 42.8 pounds of 18% HCl. The overhead stream 28 would have only a trace of hydrogen chloride and 941 pounds combined weight of water when condensed in one of the various heat transfer units. The heat in this vapor could be utilized in the pickle line because the maximum temperature is 185° F. in any of these streams. Some of this heat would be utilized to preheat the sulphuric acid going to the reactor 42 in heat exchanger 29 and 29a.

As previously stated, the underflow of the concentrator or strong waste pickle liquor is pumped at 46 into the reactor 42. Stoichiometric equivalent of 95% sulphuric acid is also added to the reactor forming ferrous sulphate and hydrogen chloride. Simultaneously, there is formed in the reactor 1340 pounds of ferrous sulphate monohydrate. This is removed from the recycled liquor through pump 56 by the filter equipment 54. The filtered sulphate is then added to the ferrous sulphate monohydrate storage 62.

The overhead from the reactor 42 through line 48 is used as a source of energy to operate the concentrator 10 in the heat exchanger 22. These vapors are then condensed to strong hydrochloric acid. In this example, it takes 719 pounds of HCl and 1,433.4 pounds of water to make 33.25% HCl for a total of 2,162.6 pounds. Some of the excess heat from concentrator 10 is used to operate the reboiler 32 of the acid vapor fractionator 24.

If the weak acid from the reboiler 32 is added to the stream, a net concentration of 33% HCl is produced.

EXAMPLE II

The liquor in Example II has the following analysis and weight: ferrous chloride 20%, 1,000 pounds; hydrogen chloride 6%, 300 pounds; water 74%, 3,700 pounds.

This weak pickle liquor is fed to the concentrator as line 14. In the concentrator, the weak pickle is separated into two streams called the vapor overhead stream 26 and the underflow stream pumped out at 46.

The vapor overhead stream 26 consists of hydrogen chloride vapor and water vapor. The overhead stream has 116 pounds of hydrogen chloride vapor and 2,252 pounds of water vapor. In the fractionator 24 at the stream which corresponds to 2,368 pounds of 5% hydrochloric acid if it were condensed as such, is separated as water vapor with only a trace of hydrogen chloride. This stream of vapor 28, when condensed, corresponds to 1,841 pounds of usable water. The underflow from the reboiler 32 would have 643 pounds of 18% hydrochloric acid. This can be stored as such in the reservoir 38 or added to form the final strong hydrochloric acid at 64.

The underflow of the concentrator which is pumped into reactor 42 comprises: ferrous chloride 38%, 1,000 pounds; hydrogen chloride 7%, 184 pounds; water 1,447 pounds, for a total weight of 2,631 pounds. This stream at 46 is fed to the reactor 42 at its boiling point. Also fed to the reactor 42, which now contains sulphuric acid of 35-50% and saturated with ferrous sulphate and equilibrium hydrogen chloride, is preheated 95% sulphuric acid (814 pounds). In the double exchange reaction which takes place, 575 pounds of hydrogen chloride is formed. Additionally, 1,340 pounds of ferrous sulphate monohydrate crystals are formed as the reactor mother liquor is saturated with ferrous sulphate. These crystals are removed from the liquor with the filter system which comprises pump 56, associated lines 56A, B and C, and the filter 54.

The overhead 48 from the reactor 42 consists of the 575 pounds of hydrogen chloride liberated by the double exchange plus the free hydrogen chloride in the strong waste pickle liquor. This yields a total of 759 pounds of hydrogen chloride. Also located in the stream are 1,346 pounds of water vapor. This stream condensed at heat exchanger 22 results in 2,105 pounds of 36% hydrochloric acid in acid cooler 36. If the acid from reservoir 38 is added to that of the cooler 36, the resulting acid collected at 64 is 32% hydrochloric acid.

This process does not have to concentrate the sulphuric acid for reuse and may be operated at such a pressure that the overhead vapor has accessible excess usable energy.

EXAMPLE III

The waste pickle liquor of Example III has the following analysis: ferrous chloride 17%, 1,000 pounds; hydrogen chloride 6%, 353 pounds, water 4,529 pounds, for a total weight of 5,882 pounds. The underflow from the concentrator 10 yields a strong waste pickle liquor delivered to the reactor 42 with the following composition: ferrous choride 38%, 1,000 pounds, hydrogen chloride 7.5%, 197 pounds; water 54.5%, 1,434.2 pounds for a total weight of 2,631 pounds. The overhead 26 of the concentrator 10 has 156 pounds of hydrogen chloride and 3,095 pounds of water vapor, which in the fractionator 24 is separated as 2384 pounds of condensation with a trace of hydrogen chloride through the overhead line 28 and 867 pounds of hydrochloric acid at 18% composition through the reboiler 32.

In addition to the strong waste pickle liquor from the underflow 56 of the concentrator, 814 pounds of 95% sulphuric acid is added to the reactor while 142 pounds of water is removed as water of crystallization from 1,340 pounds of ferrous sulphate monohydrate. The overhead 48 from the reactor 42 comprises 773 pounds of hydrogen chloride and 1,333 pounds of water vapor condensed in heat exchanger 22 and sent to acid cooler 36 which yields 36.7% hydrochloric acid. If the acid produced in the reboiler 32 (stored in storage tank 38) is added to the acid produced in 36, the acid is 31.3% hydrogen chloride as stored at 64.

It will be understood that various changes and modifications such as the use of different kinds of heat exchangers or different rerouting of energies from water vapors or changing the concentration of the pickling waste may be made from the foregoing without departing from the spirit and scope of the appended claims.

I claim:

1. A method for recovering hydrochloric acid from hydrochloric acid pickling waste comprising the steps of:
    (a) concentrating said pickling waste by separating said waste into (1) a vapor overhead stream of hydrogen chloride vapor and water vapor and (2) an underflow stream of strong pickling waste;
    (b) separating by means of a fractionator said overhead stream into (1) water vapor and (2) hydrochloric acid;
    (c) storing said fractionated hydrochloric acid;
    (d) reacting said concentrated underflow stream of strong pickling waste with concentrated sulphuric acid in a double exchange reactor;
    (e) circulating and condensing hydrogen chloride liberated by said double exchange reaction and the hydrogen chloride from said concentrated pickling waste;
    (f) filtering out and storing ferrous sulphate monohydrate formed in said double exchange reaction.

2. The method of claim 1 wherein said concentrated sulfuric acid is preheated.

3. The method of claim 2 further comprising the step of:
    adding together and storing said condensed hydrogen chloride and said fractionated hydrogen chloride.

4. The method of claim 3 wherein the energy required for the step of concentrating said pickling waste is provided by the vapors of the said double exchange reactor.

5. The method of claim 1 wherein said vapor overhead stream of hydrogen chloride vapor and water vapor provides heat to preheat said concentrated sulphuric acid.

6. The method of claim 5 wherein said double exchange reactor is operated at such a concentration of sulphuric acid that will produce the concentration of water vapor and hydrogen chloride commensurate with the strength of the strong waste acid reaching said reactor.

7. The method of claim 6 wherein additional heat is supplied to said double exchange reaction by electrodes which utilize the conductivity of the liquor.

8. The method of claim 7 wherein the mother liquor of said reactor is recycled through a centrifugal filter to remove said crystallized ferrous sulphate monohydrate.

* * * * *

UNITED STATES PATENT AND TRADEMARK OFFICE
CERTIFICATE OF CORRECTION

PATENT NO. : 4,222,997
DATED : September 16, 1980
INVENTOR(S) : Brazier K. Beecher It is certified that error appears in the above—identified patent and that said Letters Patent is hereby corrected as shown below:

On The Title Page The Assignee should read -- Voss Steel Corporation, Taylor, Mich., part interest --.

Column 2, line 59, "reflux" should read -- reflex --.

Column 2, lines 61, 62 and 63, cancel "The lines 28 contain overhead vapor which is condensed to produce recyclable water."

Column 3, line 5, before "strong" insert -- the --.

Signed and Sealed this

Fourth Day of August 1981

[SEAL]

Attest:

GERALD J. MOSSINGHOFF

Attesting Officer

Commissioner of Patents and Trademarks